Oct. 15, 1957     H. O. HALVORSON     2,809,933
BIOLOGICAL PURIFICATION SYSTEM
Filed Dec. 23, 1953     2 Sheets-Sheet 1
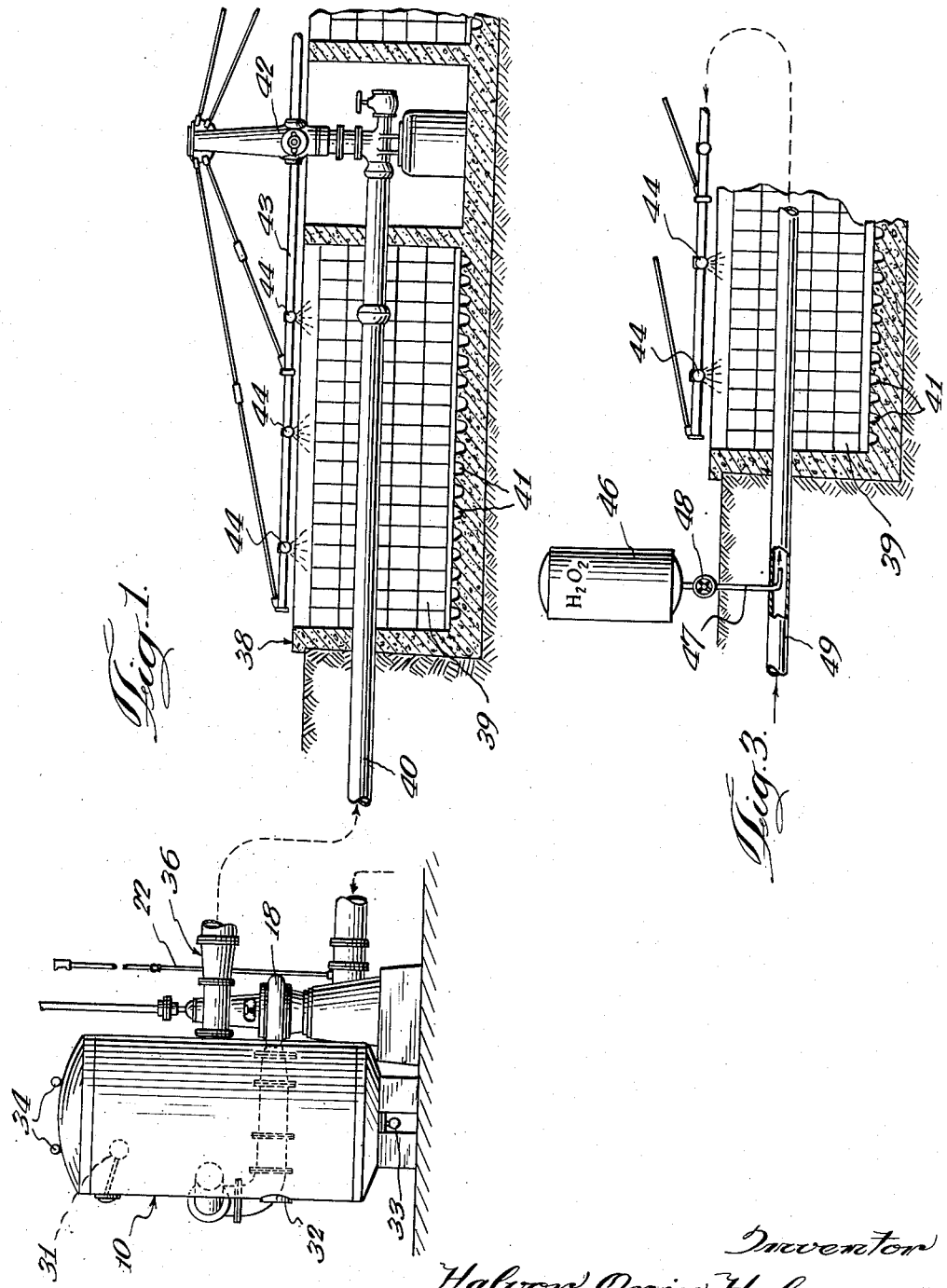

Oct. 15, 1957
H. O. HALVORSON
2,809,933
BIOLOGICAL PURIFICATION SYSTEM
Filed Dec. 23, 1953
2 Sheets-Sheet 2
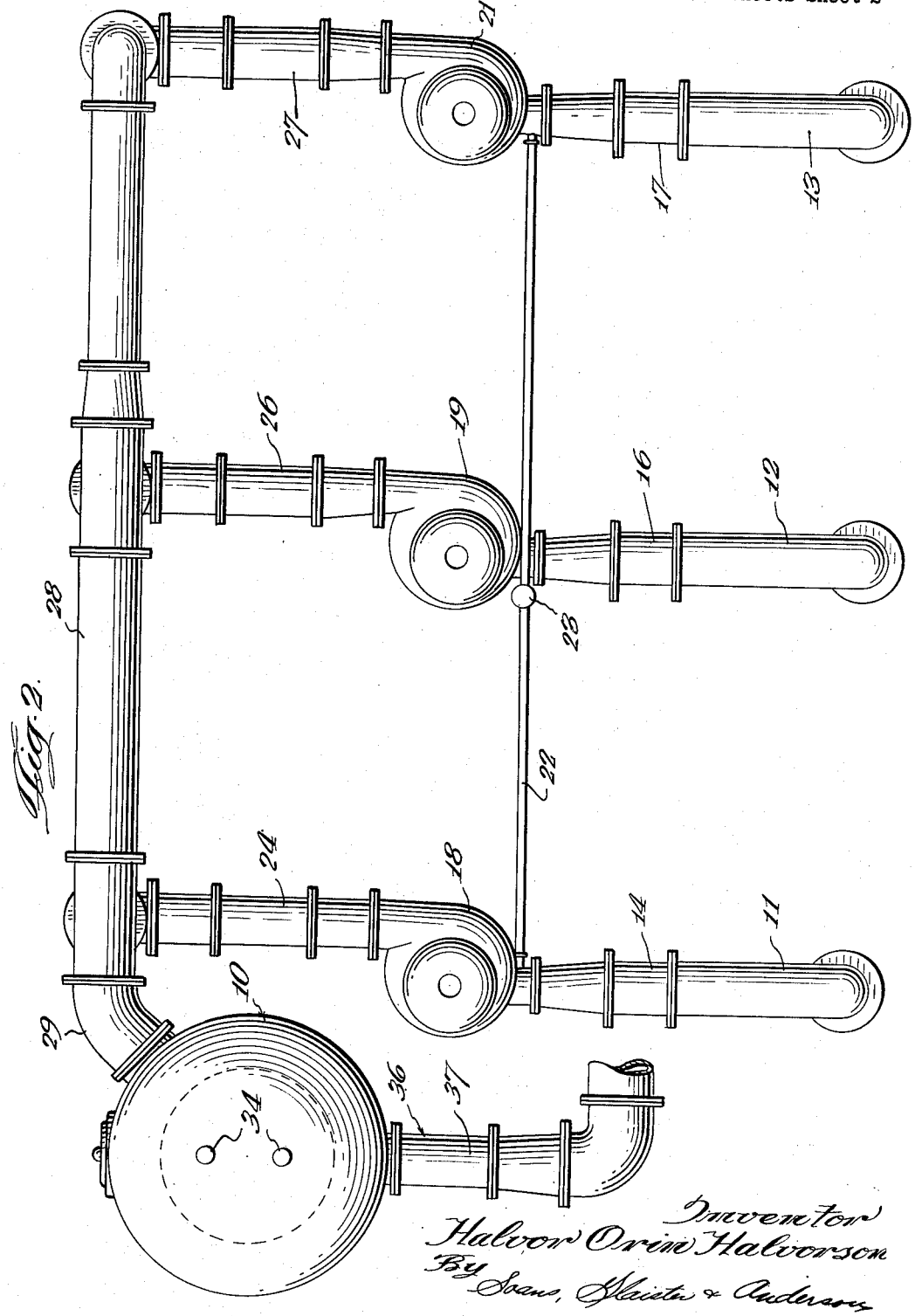

United States Patent Office 2,809,933
Patented Oct. 15, 1957

2,809,933

BIOLOGICAL PURIFICATION SYSTEM

Halvor Orin Halvorson, Urbana, Ill.

Application December 23, 1953, Serial No. 400,052

4 Claims. (Cl. 210—16)

The present invention is directed to biological purification systems and is concerned particularly with a method and apparatus for reducing the biological oxygen demand of waste products such as sewage and various types of industrial wastes.

Sewage and similar waste materials when received in a sewage treating plant have a characteristic biological oxygen demand (B. O. D.) which, unless satisfied, will rob marine life of oxygen if the sewage is introduced directly into a body of water. It is for the primary purpose of at least partially satisfying this biological oxygen demand that sewage and waste materials are treated in modern waste disposal systems.

In recent years the most important sewage treating processes commercially have been those which employ aerobic bacteria as the medium for rendering the waste product innocuous by satisfying at least part of the characteristic biological oxygen demand of the product. The two most commonly practiced aerobic treating systems involve either the use of a trickling filter or a system known as the activated sludge process. In each case, the biologically active bacteria are used to oxidize or nitrify various organic components of the sewage to produce an effluent which is relatively innocuous to marine life and can therefore be discharged directly into natural water courses or the like.

In the usual trickling filter system, the sewage is initially conducted through settling tanks to effect removal of the settlable solids. After this initial treatment, the remaining effluent is dispersed over a filter bed which may consist of graded rock, a honeycomb arrangement of vitrified clay blocks, or other media on which aerobic microorganisms are growing. Since an adequate supply of air is essential for the proper growth of the aerobic microorganisms on the exposed surfaces of the filter, the filter media are usually contained in a treating tank which is provided with means for continuous circulation of air through the filter.

The liquid passing into the trickling filter is desirably sprinkled on the top surface of the filter by a mechanism which delivers the liquid in droplet form. The rate at which the liquid is delivered to the filter is also important, as disclosed in U. S. Patent No. 2,141,979. As the liquid flows downwardly through the filter and over the filter media surfaces, the organic material contained therein is trapped or absorbed by the aerobic microorganisms growing on the media. The treated liquid is withdrawn from the base of the filter and is then passed to a mechanical clarifier or settling tank. The effluent from the settling tank is usually of sufficiently low oxygen demand to permit discharge of the effluent directly into a natural water course. Efficient operation of a trickling filter will ordinarily reduce the biological oxygen demand by a value of about 85 percent or higher.

The other commonly used system, the activated sludge process, begins with a primary settling stage in which the settlable solids are removed. The effluent from the settling tanks is then mixed with a sludge containing aerobic microorganisms, the sludge being derived from previously treated waste products. The mixture of sewage and sludge is agitated in an aerating tank for at least several hours. The aeration is usually accomplished by blowing air into the mixture from the bottom of the aerating tank or by mechanical stirring which brings the waste in contact with air at the surface. During aeration, bacteria growing in the particles of sludge will occlude or absorb the organic materials in the sewage thereby increasing the amount of sludge. After aeration, the sewage and sludge are allowed to settle and a portion of the sludge is recovered to be used for the inoculation of waste material. The effluent, if sufficiently low in biological oxygen demand, may be passed into a natural water course or the like.

Some difficulties have been experienced in systems of the type described above which employ aerobic microorganisms as the primary means for reducing the biological oxygen demand. Such systems, for example, operate at varying degrees of efficiency and occasionally become very inefficient. At times, the efficiency becomes so low that shut downs are required. The reasons for these difficulties have not been wholly understood by those skilled in the art.

As a result of my investigations, it appears that the prior difficulties experienced in the operation of systems which depend upon the efficient use of aerobic microorganisms result from the fact that the biological oxygen demand of waste products frequently manifests itself in two phases. The first of these is what I have here called the immediate oxygen demand, and this is evidenced by an almost instantaneous reaction between some of the organic matter in the waste material and oxygen immediately upon contact of the organic material with a source of oxygen. It is possible that this immediate demand is due to the presence of unsaturated polymerization products in the waste product which are highly reactive toward oxygen. This theory is supported somewhat by the fact that the immediate oxygen demand of any waste products may vary considerably with time, and a product which has very little immediate oxygen demand may have a dangerously high oxygen demand even after relatively short periods of standing.

The total amount of biological oxygen demand of a waste product is rarely an indication of the relative amount of immediate oxygen demand. Some waste products, for example, may have a low overall demand but a large portion of this biological oxygen demand may be represented by an immediate oxygen demand. Conversely, products which have a high biological oxygen demand may have only a small portion of that demand represented by an immediate oxygen demand. Also, as noted above, the time interval before treatment may change the total demand, or the ratio of immediate to overall demand, or both.

The main difficulty attributable to the immediate oxygen demand of a waste product is the fact that the highly oxygen receptive materials immediately absorb oxygen up to the limit of the immediate oxygen demand, with the result that oxygen which would otherwise be available for the proper growth and nourishment of the aerobic bacteria is effectively removed. This rapid reduction in the amount of oxygen available to the bacteria inhibits the growth and decreases the activity of the bacteria, and in extreme cases may even kill the organisms. Moreover, the deleterious effects of the sudden reduction in the amount of oxygen available may cause bacterial injury which proceeds progressively into the surface masses of zoogloeic, biologically active materials, such as are found in trickling filters. Hence, the entire mass of biological active materials may be substantially deactivated after continued treatment of waste products having high immediate oxygen demand characteristics.

The actual quantitative amount of the immediate oxygen demand varies considerably, depending upon the nature of the product being treated. However, even the more common types of sewage products may have an immediate oxygen demand as high as from about 8 to 20 parts per million. Waste products having immediate oxygen demand well in excess of 20 parts per million are not uncommon, and I have found that some waste products, such as the waste from cheese factories and canning plants may have immediate oxygen demands of several hundred parts per million. Since water under ordinary conditions of temperature and pressure cannot dissolve more than about 8 parts per million of oxygen, even a completely aerated water solution is thus not always effective in satisfying the immediate oxygen demand of waste products having even a small immediate oxygen demand.

The present invention is directed to a system for satisfying the immediate oxygen demand of sewage and other waste products and is particularly directed to the treatment of those products which have an immediate oxygen demand in excess of the amount of oxygen soluble in the product under the conditions of temperature and pressure employed in the biologically active treating process. In its broader aspects, the present invention provides a means for introducing into such waste products an amount of oxygen substantially in excess of the amount of oxygen soluble in the waste product under the prevailing conditions, and reacting the waste product with the oxygen prior to passage of the product into a trickling filter or other system employing aerobic bacteria. After the immediate oxygen demand has been satisfied, the satisfaction of the remaining biological oxygen demand proceeds considerably more slowly and hence can be carried out on existing biologically active systems utilizing aerobic bacteria.

The principal object of the present invention is the provision of a method for satisfying the immediate oxygen demand of waste products as a primary step in the treatment of such products in biologically active purification systems.

While useful with either the trickling filter or the activated sludge process, the invention has particular advantages when used in conjunction with trickling filters, and hence a more specific object of the invention is to provide a simple and convenient method for effecting the oxygenation of waste products to reduce or completely satisfy their immediate oxygen demand in a process employing high flow rates and a minimum amount of apparatus.

Another object of the invention is to provide simple but effective apparatus for accomplishing the above described methods of operation.

A further description of the present invention will be made in connection with the attached sheets of drawings which illustrate two embodiments of the invention. The systems illustrated in the drawings involve the use of a trickling filter as the biologically active means for satisfying the remainder of the biological oxygen demand but it will be recognized that the principles involved in the operation of the process are equally applicable to processes employing the activated sludge treatment as well.

Figure 1 is a view in elevation of a system embodying the teachings of the present invention;

Figure 2 is a plan view on a somewhat enlarged scale illustrating the manner in which the waste produce is introduced into the treating tank for satisfying its immediate oxygen demand; and Figure 3 is a somewhat schematic view, with parts in elevation of another system which may be employed for treating the same type of waste products.

In Figures 1 and 2, reference numeral 10 indicates generally a cylindrical treating tank where the satisfaction of the immediate oxygen demand takes place.

The raw sewage product is received into the system through a plurality of inlets 11, 12, and 13, the inlets being provided with valved sections 14, 16, and 17, respectively, which control the relative amounts of flow into a plurality of pumps 18, 19, and 21. The pumps illustrated in the drawings are of the centrifugal type but it will be recognized that other pumping means can be employed if desired.

The sewage product being treated may be any of a variety of types which have troublesome immediate oxygen demands. For example, it may be domestic sewage, waste from dairy plants, pickling plants, canneries, packing houses, or mixtures of these types. The process of the invention is also applicable to the treatment of materials such as the supernatant liquid recovered from a digester of a sewage treating plant. The latter liquid frequently has an extremely high B. O. D. and is sometimes mixed with raw sewage and passed through the sewage processing plant. By employing the process of the present invention on this type of product before it is mixed with the raw sewage, an existing biologically active filter is more likely to be able to handle the mixture efficiently.

As the waste product enters the pumps, it is subjected to the action of compressed air or other oxygen-containing gas being supplied to the pumps through an air line 22 equipped with a flow meter 23. During the operation of the pumps, the waste product is agitated rather violently, while under pressure, and as a result a relatively large amount of the pressured air is trapped therein. As a result, the discharge of the pump is a well-mixed combination of the waste product, free oxygen, and more dissolved oxygen than would be ordinarily soluble in the waste product under the conditions prevailing in the trickling filter system (i. e. at normal temperature and atmospheric pressure).

The flow of liquid-gas mixture leaving the pumps is controlled by valved sections 24, 26, and 27, respectively, associated with each of the pumps. A controlled amount of the mixture is passed continuously from each of the pump discharge lines into a manifold 28 which in turn supplies the mixture to the tank 10 through an elbow 29.

The tank 10 is provided with a level control mechanism which may include a float 31 (Figure 1) cooperating with a solenoid or similar device to cut off the supply of liquid and gas from one or more of the pumps when the float 31 reaches a predetermined position. The tank 10 is also provided with manhole 32 to permit cleaning, a drain 33 at the base of the tank for discharging completely the contents of the tank, and a pair of vents 34 at the top of the tank which are arranged to open in the event that the air pressure in the tank exceeds a predetermined value.

The mixture of liquid and gas contained in the tank 10 under pressure may be discharged therefrom continuously or intermittently. In either event the discharge rate should be adjusted to provide a retention time of sufficient duration to effect substantially complete satisfaction of the immediate oxygen demand of the product being treated. Since the reaction time is usually of rather short duration, the retention time in the tank 10 need not normally exceed more than a few seconds. Periods of 2–30 seconds have been found satisfactory for most types of sewage, when operating at gage pressures of 5 to 60 pounds per square inch. Discharge from the tank is through a discharge line 36 and is controlled by a valve means 37 which may be automatically controlled in response to a time or other operational cycle. Such mechanisms are known and will not be described in detail. The pressure vessel also includes safety and control mechanisms for effecting discharge of its contents or shutting down of the pumps when the level in the vessel and/or the internal pressure reaches a predetermined value.

The remaining biological oxygen demand may be satisfied in more conventional systems employing aerobic bacteria as the treating media. One such system which is of the trickling filter type is illustrated in Figure 1 and includes a concrete treating tank 38 in which a plurality of media blocks 39 are arranged in stacked engagement. Each of the filter blocks 39 provides passages for the flow of liquid through the stacked array of filter elements as well as providing for the continuous circulation of air. The zoogloeic organisms are grown on the media surfaces. Air spaces 41 are provided beneath the stacked filter elements to improve the circulation of air and to effect drainage of the treated liquid.

The discharge from the tank 10 flow through the outlet line 36 to a conduit 40 and then into a distributor 42 which includes a plurality of radially disposed discharge lines 43. Each of the lines 43 is provided with a plurality of nozzles 44 for spraying the liquid onto the filter elements 39 in droplet form.

In most instances, that is, for the more common waste products, the oxygen level achieved in the liquid being passed from the tank 10 into the filtering assembly will be on the order of 8 to 40 parts per million and usually from 10 to 30 parts per million. The greater portion of the remaining biological demand can then be satisfied quite readily by action of the biologically active filter elements in the trickling filter.

A modified form of the invention is illustrated in Figure 3 of the drawings. In this form of the invention, a compound which readily liberates oxygen when dissolved in water is used as the means for satisfying the immediate oxygen demand of the waste product. A preferred compound for this use is hydrogen peroxide which not only provides a convenient source of oxygen but has the further advantage of being a specific poison for anaerobic bacteria. Hydrogen peroxide is not harmful to aerobic bacteria except in exceedingly large quantities. Due to the inherent character and greater chemical activity of oxygen liberated from hydrogen peroxide, it is usually possible when treating with this material to eliminate the retention period employed when air is used as the oxygen source.

As shown in Figure 3, a tank 46 containing hydrogen peroxide supplies the oxidizing agent through a conduit 47 and a valve 48 into an inlet line 49 which feeds the trickling filter assembly. The line 49 may contain raw sewage or it may be the discharge line from an aeration assembly of the type illustrated in Figures 1 and 2. Upon introduction of the hydrogen peroxide into the liquid stream, the effective oxygen level of the stream is immediately raised if the amount of hydrogen peroxide introduced is sufficiently high, as determined by tests of the immediate oxygen demand prior to its introduction into the trickling filter. Normally, this immediate demand will be satisfied before the liquid enters the distributor 42.

It will be evident that various modifications can be made to the methods and apparatus described without departing from the scope of the present invention.

This application is a continuation-in-part of my copending application, Serial No. 306,384, filed August 26, 1952, now abandoned.

I claim:

1. In the method of treating a waste product containing substantial amounts of auto-oxidizable compounds and of biologically oxidizable organic matter, the steps of contacting said waste product with available oxygen under vigorous agitation in a first treating zone in the substantial absence of biologically active aerobic bacteria, said treating zone being at a super-atmospheric pressure, to maintain the oxygen concentration of said waste product at a level in excess of that equivalent to 8 parts of oxygen per million parts of waste product at 27° C. and atmospheric pressure, said waste product being contacted in said treating zone for a time sufficient to substantially completely oxidize said auto-oxidizable compounds, thereafter treating said waste product in a second treating zone with air at substantially atmospheric pressure in the presence of aerobic bacteria so as to promote aerobic bacteriologic action and thereby substantially completely oxidize the organic matter therein.

2. In the method of treating a waste product containing substantial amounts of auto-oxidizable compounds and of biologically oxidizable organic matter, the steps of contacting said waste product with available oxygen under vigorous agitation in a first treating zone in the substantial absence of biologically active aerobic bacteria, said treating zone being at a super-atmospheric pressure of between about 5 and about 60 pounds per square inch to maintain the oxygen concentration in said waste product in said first treating zone at a level in excess of that equivalent to 8 parts of oxygen per million parts of waste product at 27° C. and atmospheric pressure, said waste product being contacted in said treating zone for between about 2 and about 30 seconds so as to substantially completely oxidize said auto-oxidizable compounds, thereafter treating said waste product in a second treating zone with air at substantially atmospheric pressure in the presence of aerobic bacteria so as to promote aerobic bacteriologic action and thereby substantially completely oxidize the organic matter in said waste product.

3. In the method of treating a waste product containing substantial amounts of auto-oxidizable compounds and of biologically oxidizable organic matter, the steps of contacting said waste products in a centrifugal pump with available oxygen under vigorous agitation and super-atmospheric pressure in the substantial absence of biologically active aerobic bacteria, holding said waste product together with said oxygen dissolved therein and mixed therewith under said super-atmospheric pressure between about 2 and about 30 seconds at a pressure of between about 5 and about 60 pounds per square inch to maintain for said period of time the concentration of dissolved oxygen in said waste product at a level in excess of about that equivalent to 8 parts of oxygen per million parts of waste product at 27° C. and atmospheric pressure, so as to substantially completely oxidize said auto-oxidizable compounds, and thereafter passing said waste product to a biologically active filter and treating said waste product in said filter with air at substantially atmospheric pressure in the presence of aerobic bacteria so as to promote aerobic bacteriologic action and thereby substantially completely oxidize the organic matter in said waste product.

4. In the method of treating a waste product containing substantial amounts of auto-oxidizable compounds and of biologically oxidizable organic matter, the steps of contacting said waste product with hydrogen peroxide in a first treating zone in the substantial absence of biologically active aerobic bacteria, maintaining said contact in the presence of a sufficient amount of hydrogen peroxide to maintain the concentration of oxygen in said waste product at a level in excess of that equivalent to about 8 parts of oxygen per million parts of waste product at 27° C. and atmospheric pressure, said waste product being contacted in said treating zone for a time sufficient to substantially completely oxidize said auto-oxidizable compounds, thereafter treating said waste product in a second treating zone with air at substantially atmospheric pressure in the presence of aerobic bacteria so as to promote aerobic bacteriologic action and thereby substantially completely oxidize the organic matter in said waste product.

References Cited in the file of this patent

UNITED STATES PATENTS

| 706,075 | Lubberger | Aug. 5, 1902 |
| 895,229 | Beddves | Aug. 4, 1908 |
| 1,078,918 | Gruter | Nov. 18, 1913 |
| 1,220,990 | Irwin | Mar. 27, 1917 |
| 2,326,303 | Morek et al. | Aug. 10, 1943 |
| 2,364,298 | Kamp | Dec. 5, 1944 |
| 2,529,295 | Hood | Nov. 7, 1950 |
| 2,658,034 | Hood | Nov. 3, 1953 |
| 2,665,249 | Zimmerman | Jan. 5, 1954 |

OTHER REFERENCES

Sewerage and Sewage Treatment, Babbitt, 6th ed. (1947), pp. 305–307.